US000001811H

United States Statutory Invention Registration [19]

[11] Reg. Number: H1,811

Rescigno

[45] Published: Nov. 2, 1999

[54] APPARATUS AND METHOD FOR REDUCING LOW FREQUENCY VIBRATIONS IN POWER TOOLS

[76] Inventor: Gerald R. Rescigno, 2400 Walden Way, Marriottsville, Md. 21104

[21] Appl. No.: 08/996,588

[22] Filed: Dec. 16, 1997

[51] Int. Cl.[6] ..... B25D 17/11

[52] U.S. Cl. ..... 173/162.2

[58] Field of Search ..... 173/210, 211, 173/212, 162.1, 162.2

[56] References Cited

U.S. PATENT DOCUMENTS

| | | | |
|---|---|---|---|
| 578,020 | 3/1897 | Morse | 173/162.1 |
| 3,525,373 | 8/1970 | Kobayashi | 173/162.1 |
| 3,968,843 | 7/1976 | Shotwell | 173/162.2 |
| 4,800,965 | 1/1989 | Keller | 173/162.2 |
| 5,027,910 | 7/1991 | Honsa et al. | 173/162.2 |
| 5,692,574 | 12/1997 | Terada | 173/162.2 |
| 5,697,456 | 12/1997 | Radle et al. | 173/162.2 |

*Primary Examiner*—Charles T. Jordan
*Assistant Examiner*—Meena Chelliah

[57] ABSTRACT

A power tool having a low frequency reduction apparatus includes a first handle portion, a second handle portion, and a dual-density bladder disposed between the first and second handle portions. By disposing such bladder accordingly, the second handle portion is effectively isolated from the first handle portion, thus reducing the low frequency vibrations transmitted to the second handle portion. Preferably, a gap is formed between the first and second handle portions. In another embodiment of the invention, a dual-density bladder between a handle portion and a main housing portion of the power tool.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR REDUCING LOW FREQUENCY VIBRATIONS IN POWER TOOLS

FIELD OF THE INVENTION

This invention relates generally to power tools and, more particularly, to apparatus and methods for reducing low frequency vibrations in power tools.

BACKGROUND OF THE INVENTION

Many individuals are exposed to hand-induced vibrations by using hand-held vibrating or repeated impact-type power tools that include, but are not limited to, chipping hammers, jackhammers, riveters, jackleg drills, rotary grinders and sanders, orbital sanders, chain saws, lawn mowers, hammer drills, and string trimmers. These vibration levels can be reduced by redesigning the tool or object or by placing a vibration isolation device between the hand and the tool or object that is being clasped by the hand. For example, prior art solutions include providing a rubber layer on the tool handle. However, such solutions are not completely satisfactory as they do not reduce low frequency vibrations, i.e., vibrations having frequencies lower than 120 Hertz.

Accordingly, it is the object of the present invention to provide a method and apparatus for reducing low frequency vibrations in power tools.

SUMMARY OF THE INVENTION

The object of this invention is met by providing a dual-density bladder between a first and a second handle portion. By disposing such bladder accordingly, the second handle portion is effectively isolated from the first handle portion, thus reducing the low frequency vibrations transmitted to the second handle portion.

Similarly, the object of this invention is met by providing a dual-density bladder between a handle portion and a main housing portion.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
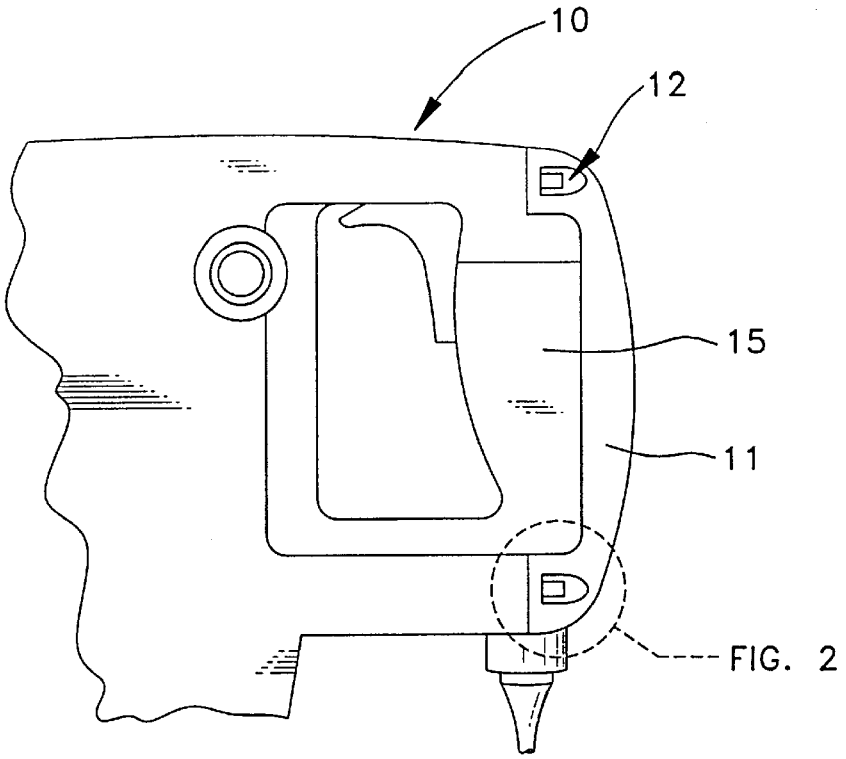
FIG. 1 is a partial side view of a power tool handle having a first embodiment of the present invention.

The invention is now described with reference to the accompanying figures, wherein like numerals designate like parts. Referring to FIG. 1, a preferred handle 10 of a power tool is provided with a rear portion 11 attached to the main portion 15 via a plurality of screws 12.

Figure 2:
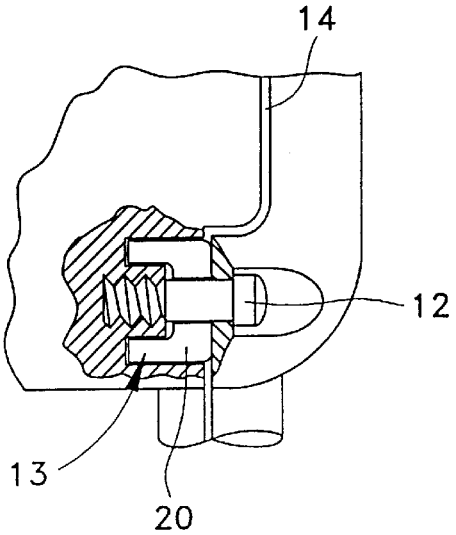
FIG. 2 is a partial cross-sectional side view of the first embodiment along the circle shown in broken lines of FIG. 1.

Referring to FIG. 2, a dual-density bladder 13 is interposed between the rear portion 11 and the main portion 15. Preferably, the bladder 13 is disposed wherever a screw 12 couples the rear portion 11 with the main portion 15.

Further, the bladder 13 may be constructed from a relatively firm, air-tight material, such as solid rubber, plastic, elastomeric material, etc. In addition, the bladder 13 includes a chamber 20, which is in turn filled with a gas, fluid, or solid having a different density than the bladder material. For example, the bladder 13 may contain air, pressurized air, rheopexic fluid, foam, etc.

A person skilled in the art will recognize that the bladder 13 can include a plurality of cavities or cells, instead of a single chamber. Similarly, a person skilled in the art will recognize that different materials can be used for constructing and/or filling the bladder 13.

Referring to FIG. 2, a gap 14 is created by interposing the bladder 13 between the rear portion 11 and the main portion 15. Accordingly, the dual-density bladder 13 in effect isolates the rear portion 11, reducing the low frequency vibrations transmitted to the rear portion 11.

Figure 3:
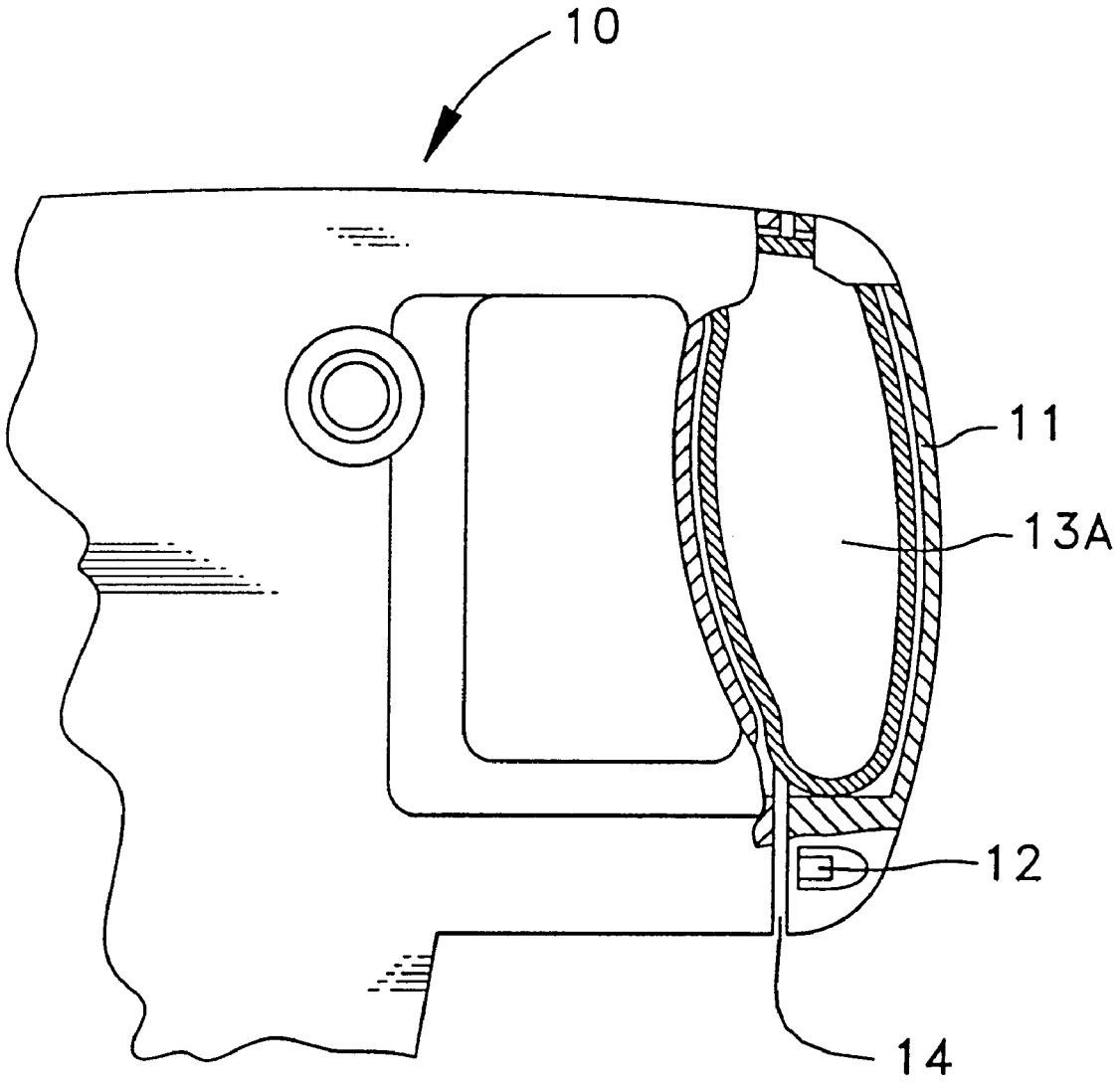
FIG. 3 is a partial cross-sectional side view of a power tool handle having a second embodiment of the present invention.

Similarly, referring to FIG. 3, a larger bladder 13*a* can be disposed within the hollow portion of the handle, creating a gap 14 between the rear portion 11 and the main portion 15.

Persons skilled in the art may recognize other comfort features that can be added to the embodiments described above, such as providing the handle with an outer rubber layer or gas- or fluid-filled layer. Similarly, persons skilled in the art may recognize other alternatives to the means disclosed herein, such as placing the bladders so that the entire handle is isolated from the power tool. However, all these additions and/or alterations are considered to be equivalents of the present invention.

I claim:

1. A power tool comprising:

a first handle portion, a second handle portion, and a dual-density bladder disposed between the first and second handle portions.

2. The power tool of claim 1, wherein a gap is formed between the first and second handle portions.

3. A power tool comprising:

a handle portion, a main housing portion, and a dual-density bladder disposed between the handle portion and the main housing portion.

4. The power tool of claim 3, wherein a gap is formed between the first and second handle portions.

* * * * *